UNITED STATES PATENT OFFICE.

MARGARET RICHARDSON, OF NORRISTOWN, PENNSYLVANIA.

IMPROVED MEDICAL COMPOUND.

Specification forming part of Letters Patent No. 55,160, dated May 29, 1866.

*To all whom it may concern:*

Be it known that I, MARGARET RICHARDSON, M. D., of Norristown, in Montgomery county, State of Pennsylvania, have invented a new and useful Medicine for the Cure of Cholera and other Bowel Complaints; and I do hereby declare the following is a full, clear, and exact description thereof.

To enable others skilled in the art to make and use my invention, I will proceed to describe its composition.

The medicine is made of a mixture of the following ingredients in certain proportions, and is used for the cure of cholera, bowel complaint, dysentery, cholera-morbus, and summer complaint: tinct. opii, f. ʒ vi; tinct. camphoræ, f. ʒ vi; tinct. olei menthæ piperita, f. ʒ vi; tinct. rhei, f. ʒ iv; tinct. zingiberis, f. ʒ vi; tinct. kino, f. ʒ ii; tinct. capsici, f. ʒ ii.

The same ingredients may be expressed in common English terms thus: tincture of opium, six drams; tincture of camphor, six drams; tincture of peppermint, six drams; tincture of ginger, six drams; tincture of rhubarb, four drams; tincture of kino, two drams; tincture of capsicum, two drams.

A dose of the above mixture for an adult is from half a tea-spoonful to a tea-spoonful every hour until the complaint is checked.

What I claim as my invention, and desire to secure by Letters Patent, is—

A medicine for the cure of cholera and other bowel complaints, made of the ingredients herein described, and in about the proportions specified.

MARGARET RICHARDSON, M. D.

Witnesses:
L. E. CORSON,
CARROLL S. TYSON.